Figure 11:
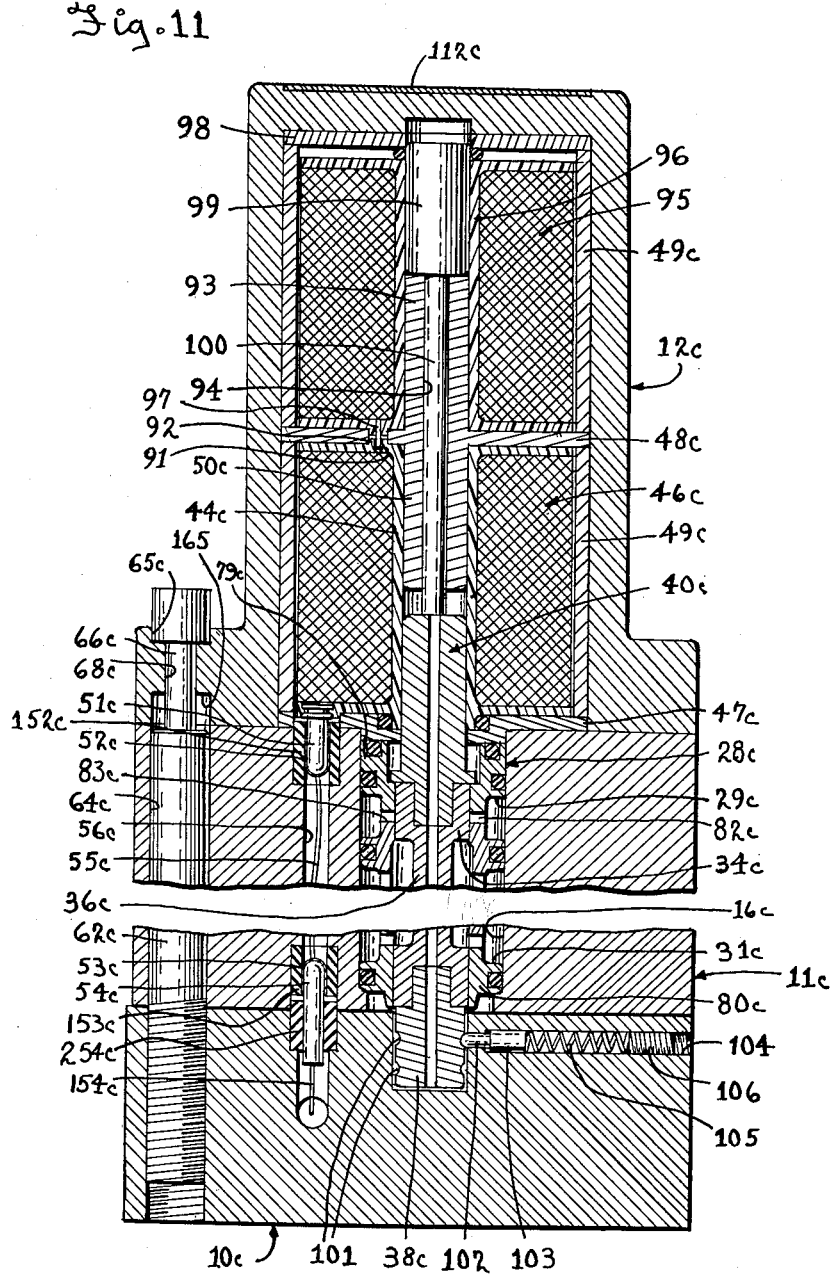

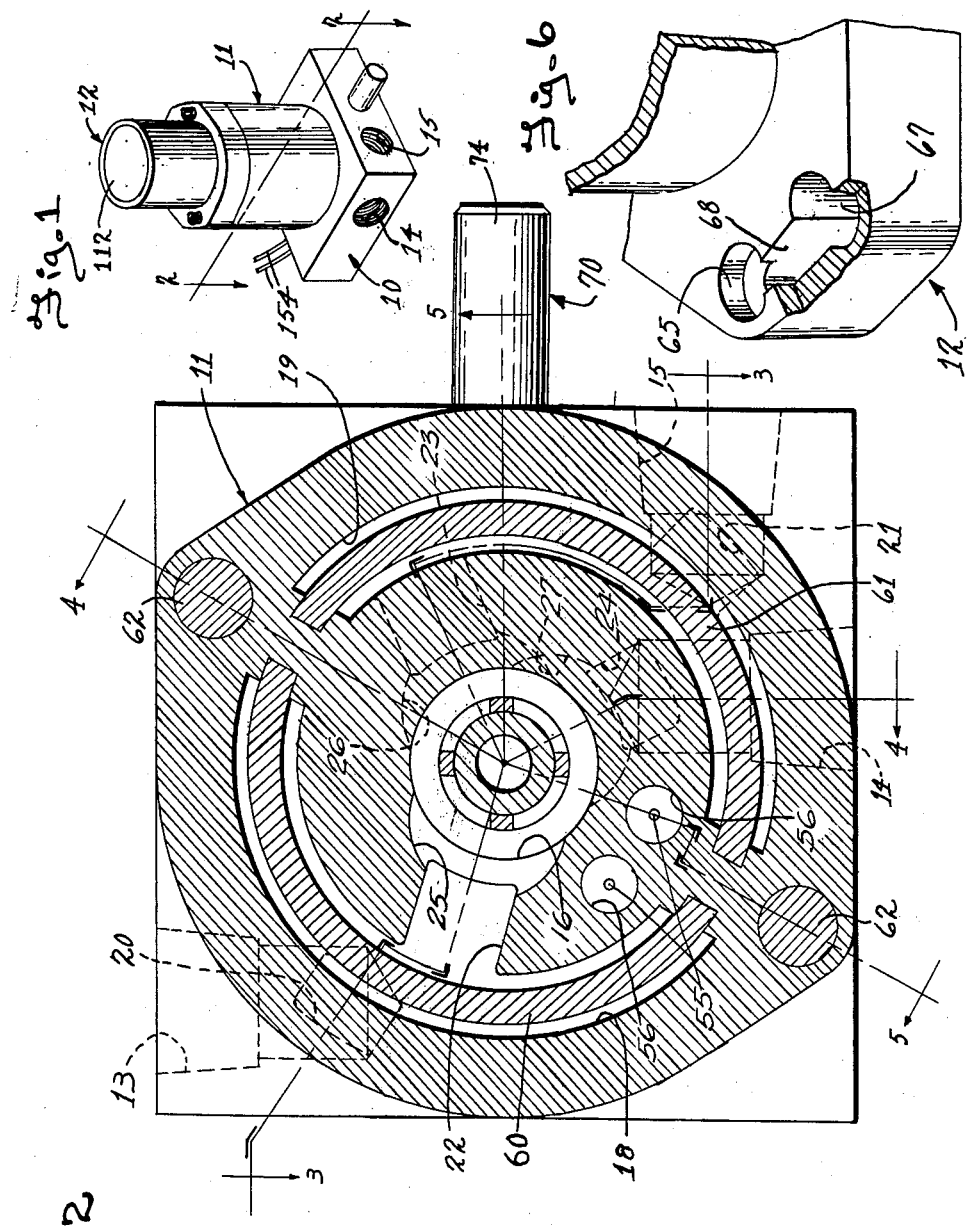

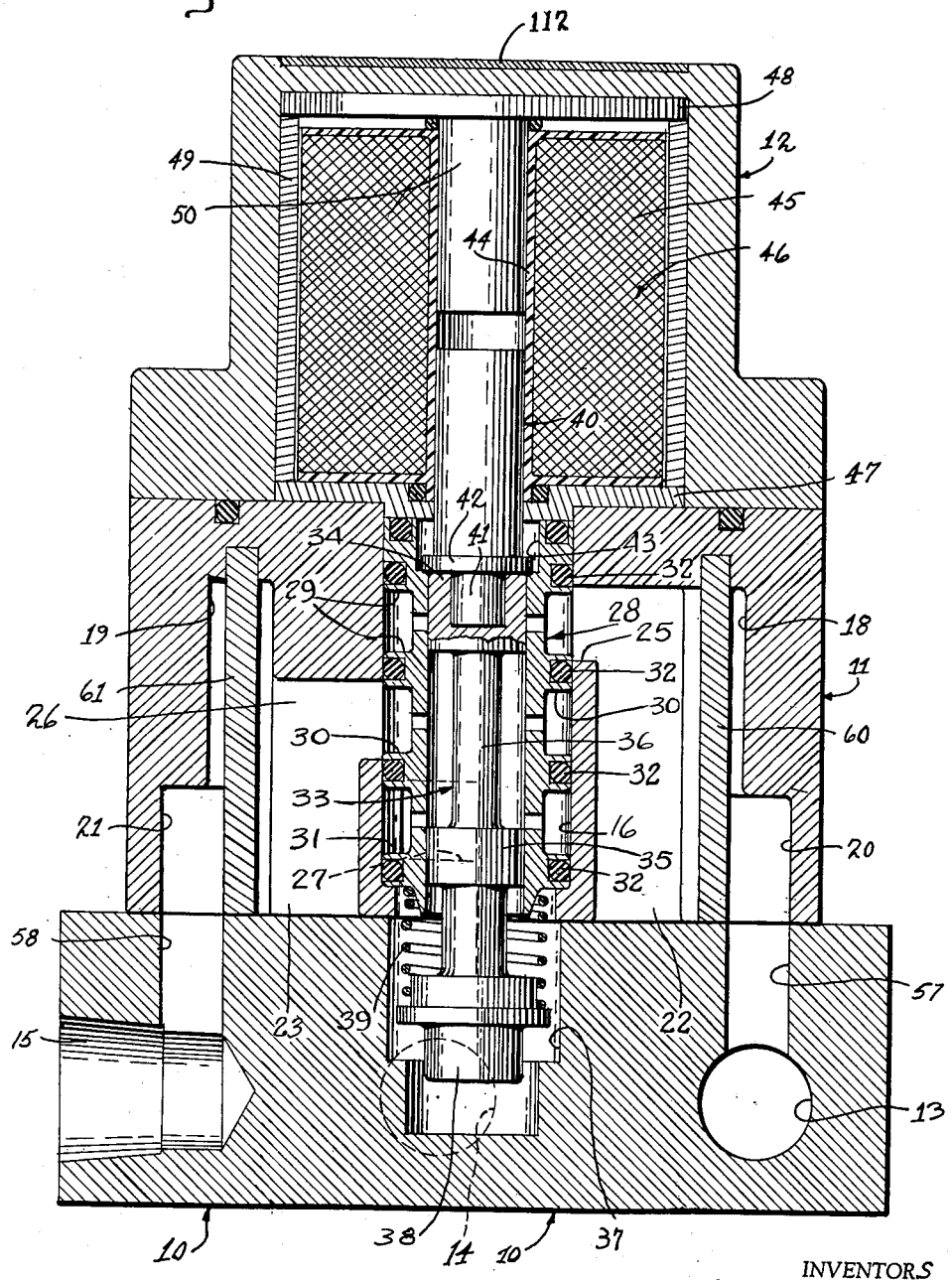

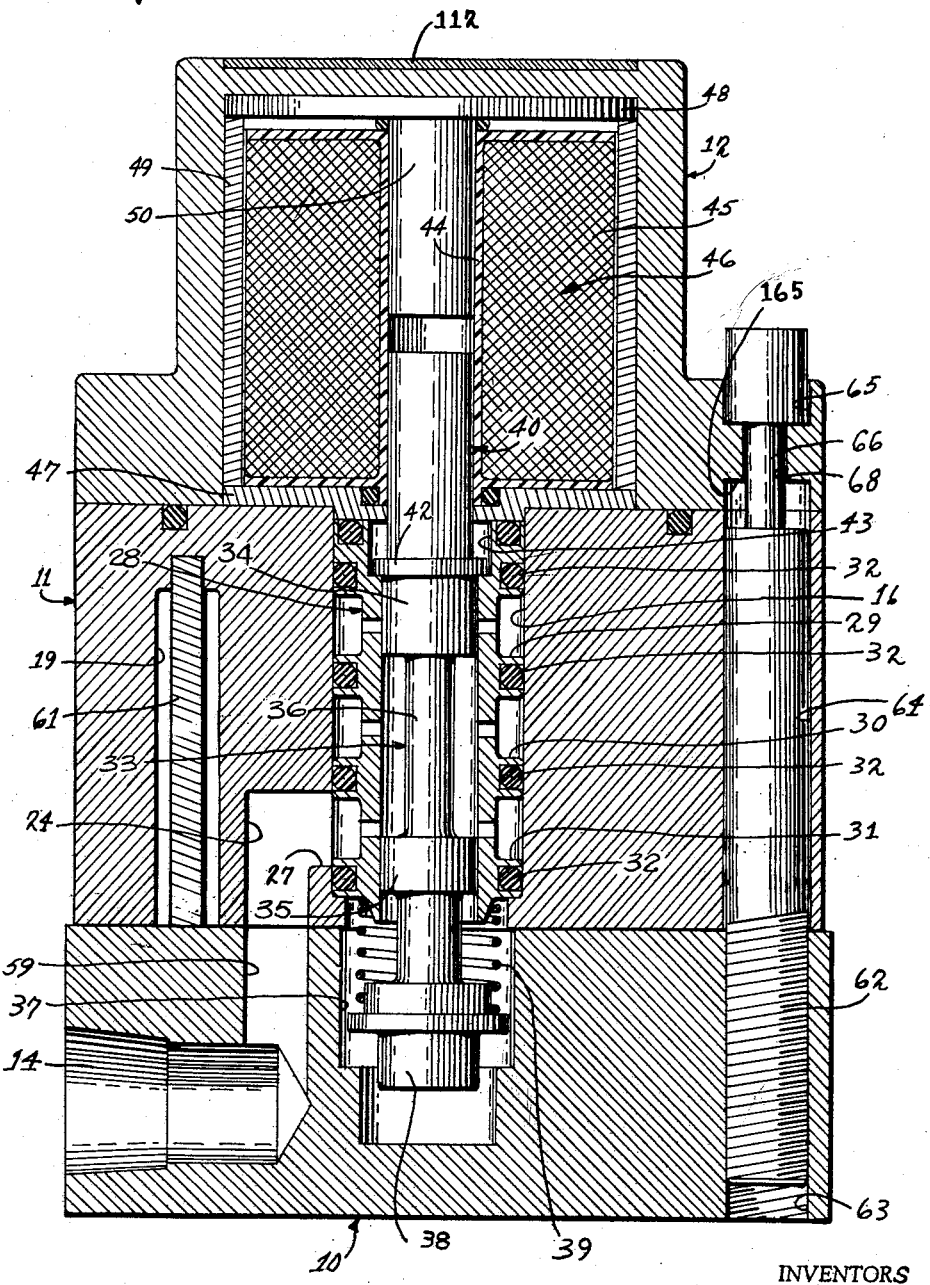

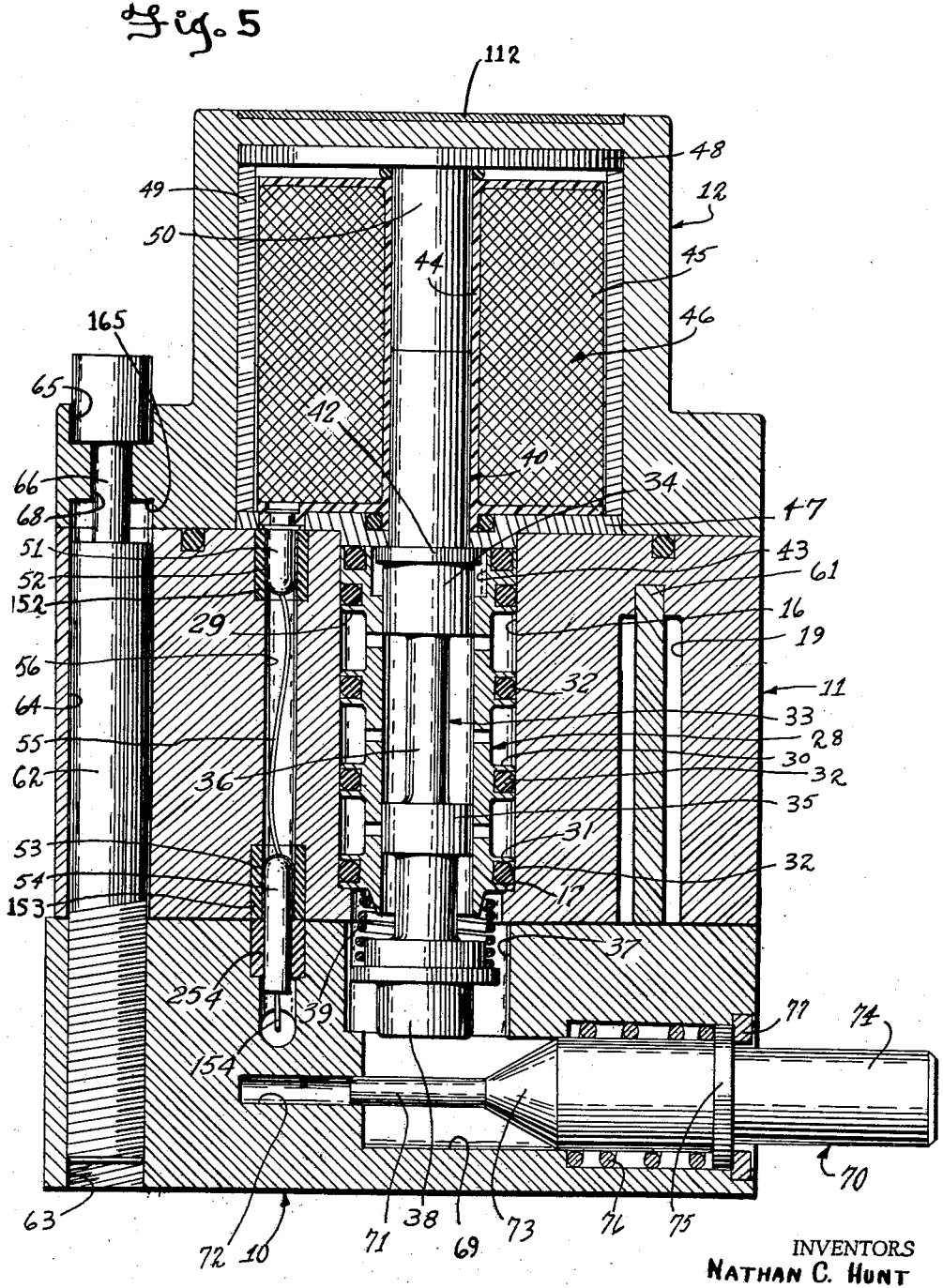

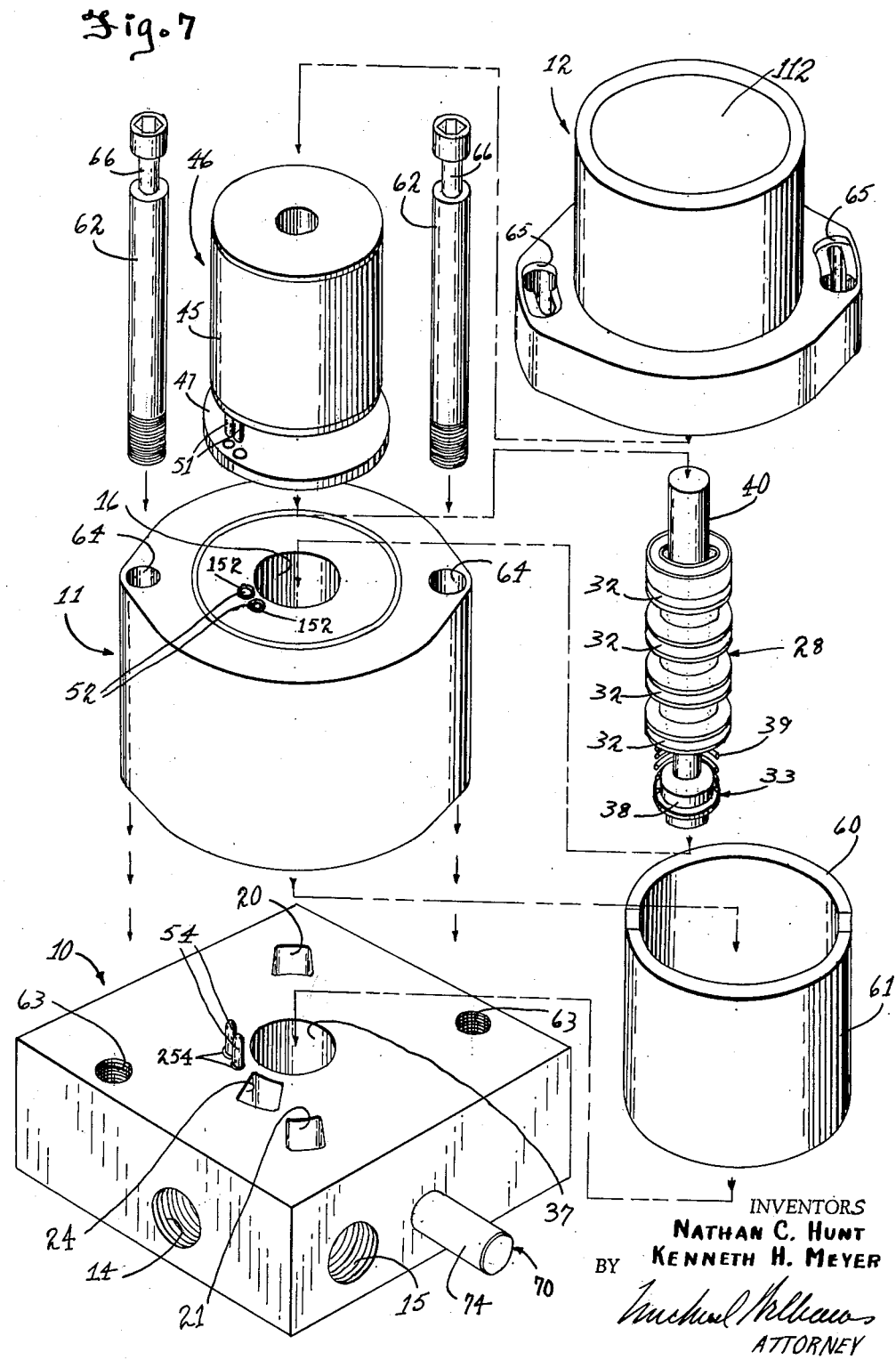

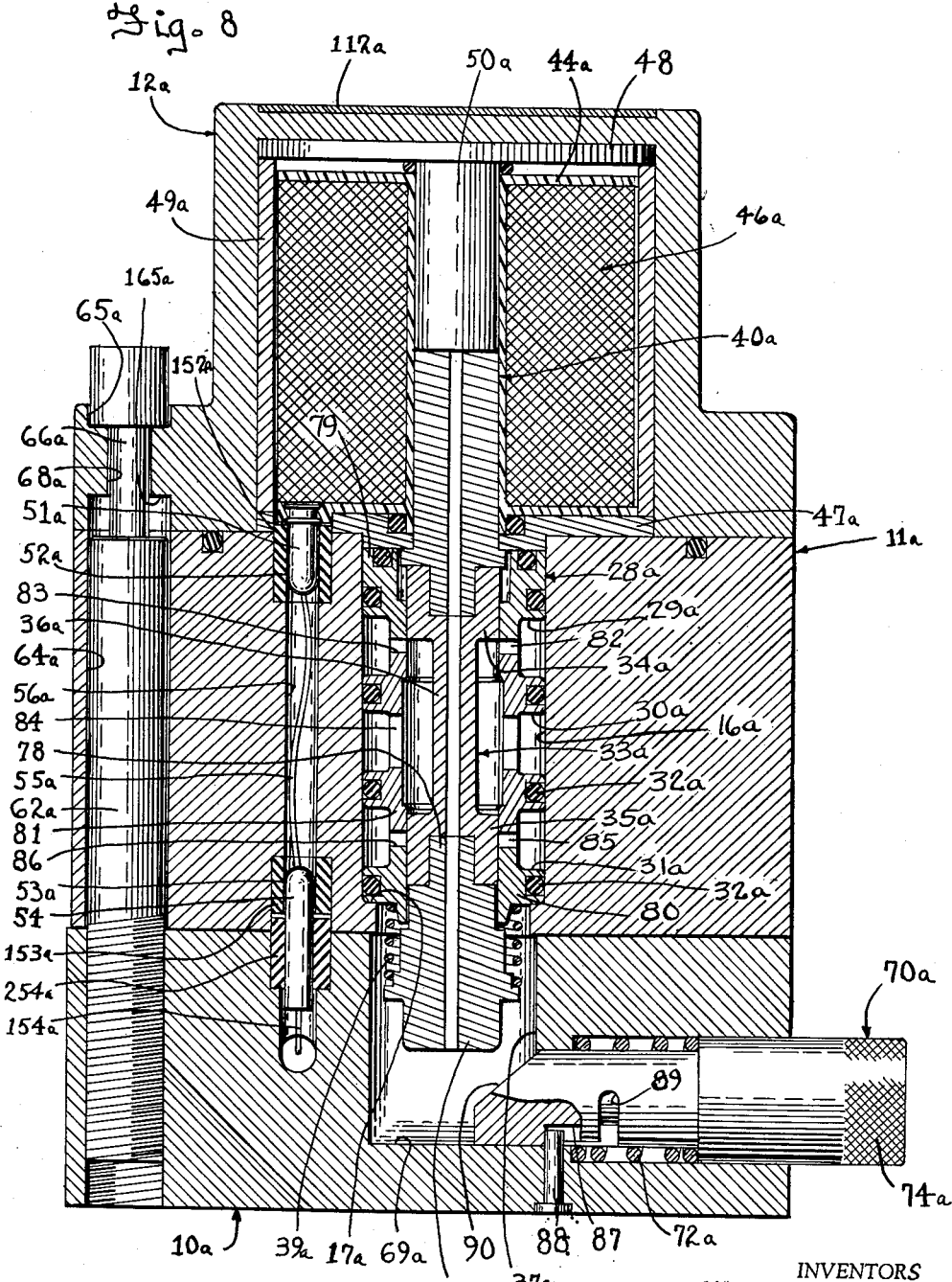

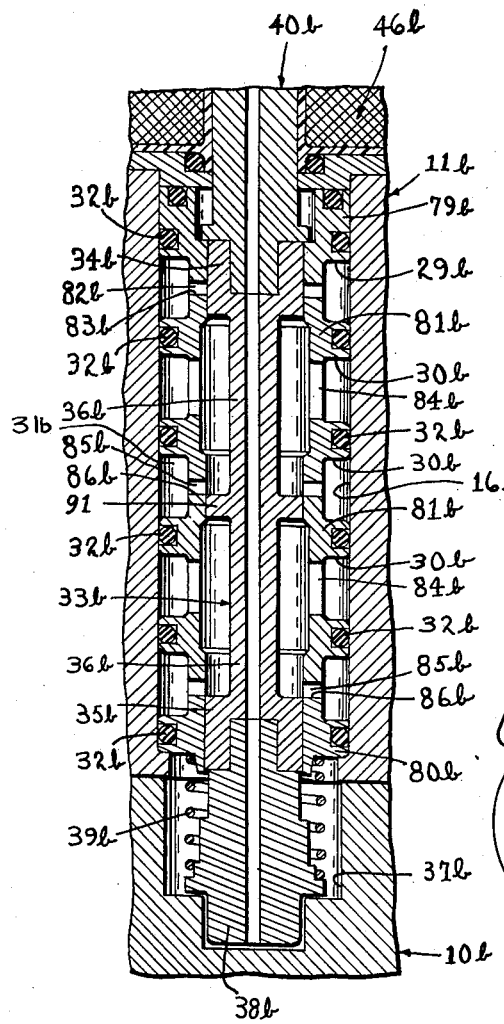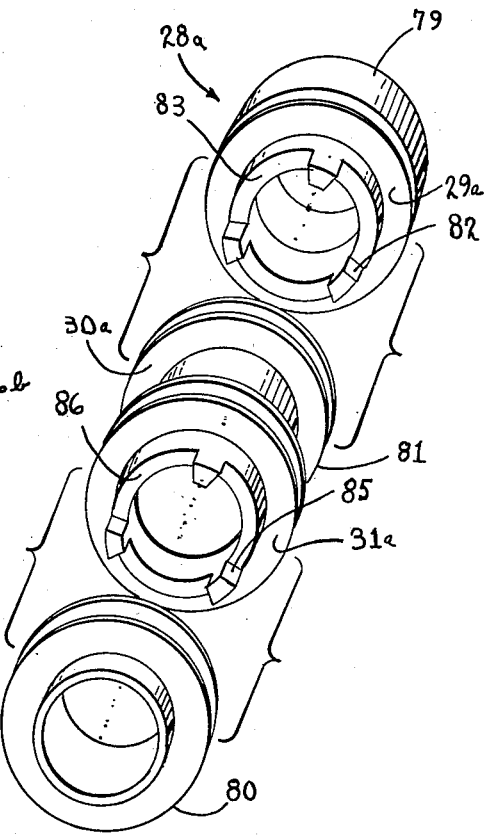

March 5, 1963 N. C. HUNT ETAL 3,079,947
ELECTROMAGNETIC FLUID CONTROL VALVE
Filed July 17, 1958 10 Sheets-Sheet 8

INVENTORS
NATHAN C. HUNT
KENNETH H. MEYER
BY
ATTORNEY

March 5, 1963

N. C. HUNT ETAL 3,079,947

ELECTROMAGNETIC FLUID CONTROL VALVE

Filed July 17, 1958

10 Sheets-Sheet 10

INVENTORS
NATHAN C. HUNT
KENNETH H. MEYER
BY

Michael Williams

ATTORNEY

United States Patent Office 3,079,947
Patented Mar. 5, 1963

3,079,947
ELECTROMAGNETIC FLUID CONTROL VALVE
Nathan C. Hunt, Miami Beach, Fla., and Kenneth H. Meyer, Salem, Ohio, assignors, by mesne assignments, to International Basic Economy Corporation, New York, N.Y., a corporation of New York
Filed July 17, 1958, Ser. No. 749,206
9 Claims. (Cl. 137—545)

The present invention relates to a valve for controlling flow of fluid, more particularly to a solenoid, or electromagnetic, fluid control valve, and the principal object of the invention is to provide new and improved valves of the character described.

Present day machines and equipment frequently use one or more solenoid valves to properly control flow of fluid under pressure. It is particularly important, especially in production line equipment, that valve malfunction and maintenance be held to a minimum since the failure of but a single small valve may shut down an entire production line until the valve is repaired or replaced.

Many prior art valves employ relatively soft, flexible sealing members to control flow of fluid therethrough; however, the use of such sealing members inevitably results in relatively rapid wear thereof with the attendant necessity of regular replacement at rather short time intervals. To obviate the necessity of frequent replacement of soft seal members, it has been proposed to fit certain metal parts of the valve together so closely that a tight seal will be effected. The primary difficulty with valves of this type is that such valves are extremely sensitive to and may be easily jammed by even the smallest of foreign particles. The present invention solves this problem by providing a valve with an integral, large capacity filter which prevents entry of foreign matter into the closely fitting valve parts.

Regardless of valve design, it is inevitable that sooner or later repairs will be required. It is, therefore, an important feature of the present invention that the instant valve may readily be disassembled for servicing or replacement of parts and then reassembled all in the space of but a minute or two and without special tools or skills. Moreover, following initial installation of a valve of present design, it may be disassembled and any of its normally wearing parts, including the solenoid coil itself, serviced or replaced without making or breaking any electrical connections. Accordingly, assembly and disassembly of the valve does not require the presence of an electrician and thus delays and costs of maintenance and repairs is considerably reduced. These and other advantages will readily become apparent from a study of the following description and from the drawings appended hereto.

Figure 12:
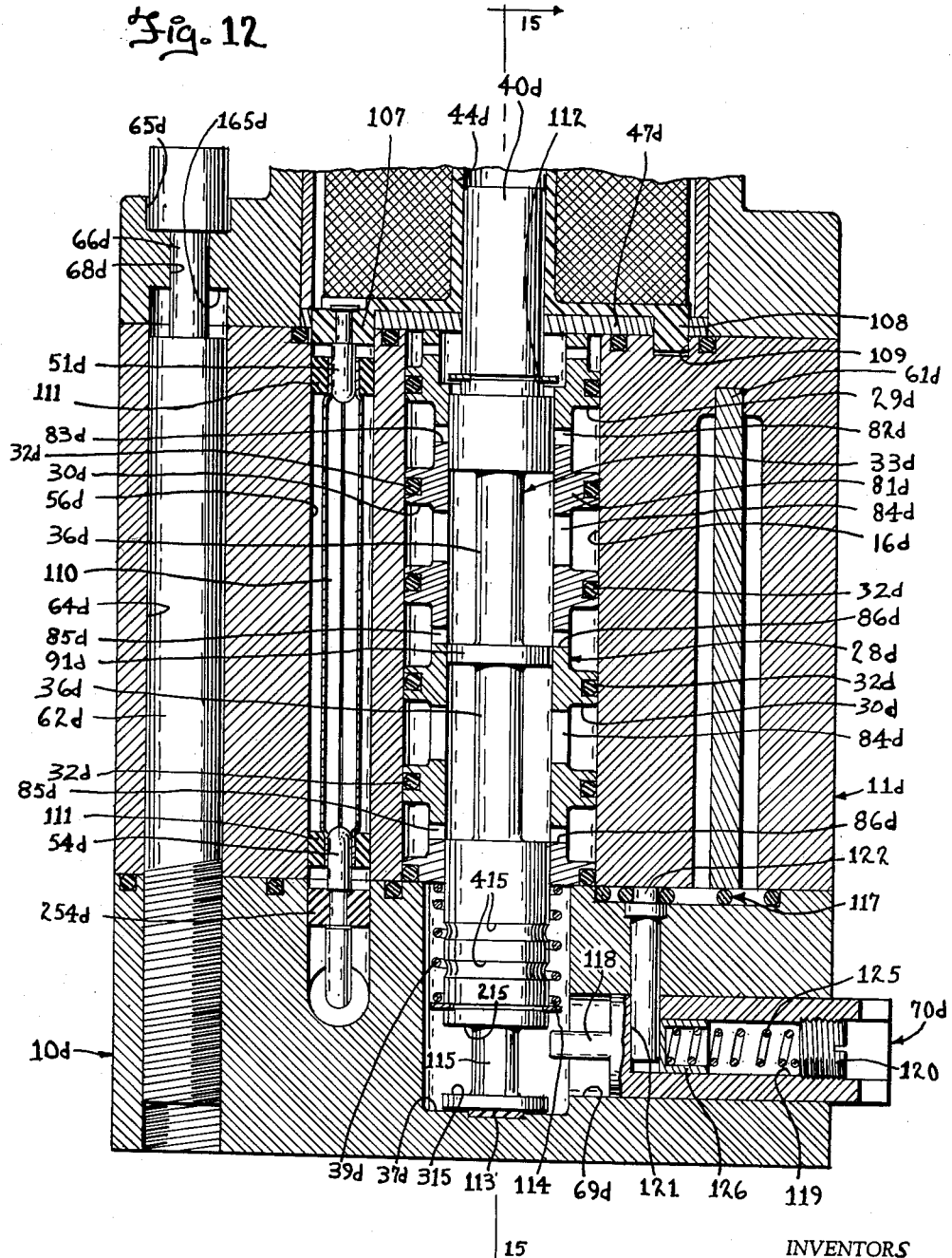
Figure 13:
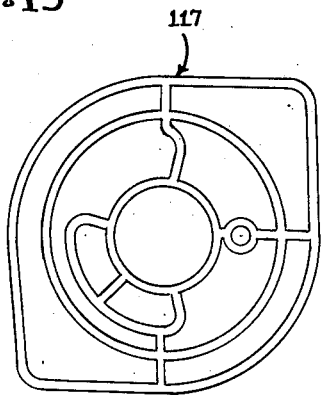
Figure 14:
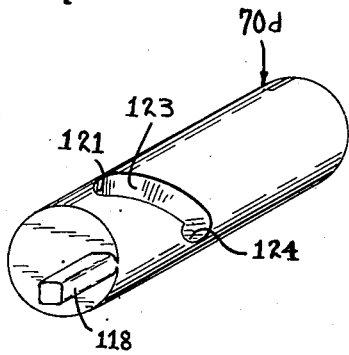
Figure 15:
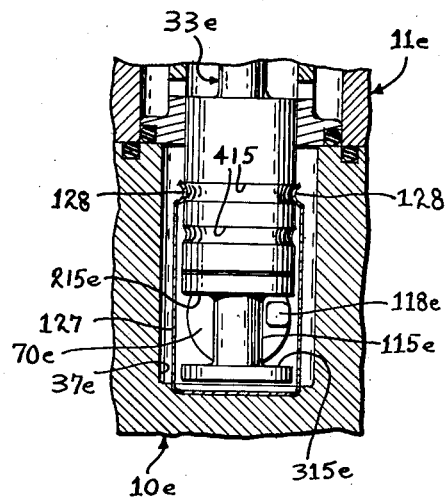

In the drawings accompanying this specification and forming a part of this application there is shown, for purpose of illustration an embodiment which the invention may assume, and in these drawings:

FIGURE 1 is a perspective view of a solenoid-operated, fluid control valve constructed in accordance with the present invention, FIGURE 2 is an enlarged sectional view generally corresponding to the line 2—2 of FIGURE 1, FIGURE 3 is a sectional view generally corresponding to the line 3—3 of FIGURE 2, FIGURE 4 is a sectional view generally corresponding to the line 4—4 of FIGURE 2, FIGURE 5 is a sectional view generally corresponding to the line 5—5 of FIGURE 2 but showing certain parts in another position, FIGURE 6 is an enlarged, broken, perspective view of a detail, FIGURE 7 is a reduced size, exploded perspective view of the invention seen in FIGURES 1 through 6, FIGURE 8 is a view similar to FIGURE 5 but of a modified construction, FIGURE 9 is a slightly enlarged exploded perspective view of certain details seen in FIGURE 8, FIGURE 10 is a fragmentary view similar to FIGURE 8 but of a somewhat different construction, FIGURE 11 is a reduced size, broken view similar to FIGURE 5 and 8 but of a still further modified construction, FIGURE 12 is a fragmentary view similar to FIGURE 8 (but of a four way valve like that fragmentarily seen in FIGURE 10), but illustrating a somewhat different construction, FIGURE 13 is a reduced size plan view of a detail seen in FIGURE 12, FIGURE 14 is a perspective view of another detail seen in FIGURE 12, and FIGURE 15 is a fragmentary sectional view generally corresponding to the line 15—15 of FIGURE 12 but of still another embodiment of the invention.

Briefly and as best seen in FIGURE 1, the valve of the present invention comprises three major components; namely, a base 10, a housing 11, and a cap 12 secured together in a manner to be seen. To prevent leakage and as seen in FIGURE 3, a suitable gasket (not shown) may be interposed between base 10 and housing 11 and an O ring or the like between the housing and the cap. As will hereinafter be disclosed in greater detail, base 10, in the present embodiment, is provided with internally threaded apertures 13, 14 and 15 in which are respectively threaded the usual pipes (not shown) which carry fluid toward and away from the valve. If desired, cap 12 may be recessed to receive a suitable name plate 112.

As best seen in FIGURES 3 through 5, housing 11 is provided with a central valve chamber 16 which is reduced in diameter at its lower end to provide a shoulder 17. Spaced radially outwardly of valve chamber 16 (see especially FIGURES 2 and 3) are, in the present embodiment, a pair of semi-annular chambers 18 and 19 each of which extends upwardly from the bottom of the housing and terminates just short of its top. It is to be understood that chambers 18 and 19 are not in communication with each other except through valve chamber 16 as will be described.

Extending upwardly from the bottom of housing 11 and intersecting the outer periphery of semi-annular chamber 18 is a conduit 20 and spaced radially from conduit 20 and extending upwardly from the bottom of the housing and intersecting the outer periphery of semiannular chamber 19 is a conduit 21. Also extending upwardly from the bottom of the housing are respective, radially spaced conduits 22, 23 which respectively intersect the inner peripheries of annular chamber 18, 19. For a purpose to be seen, conduit 22 extends upwardly a greater distance than does conduit 23. With reference to FIGURES 2 and 4, a conduit 24 extends upwardly from the bottom of housing 11, this conduit being spaced radially from conduits 22, 23 and being spaced intermediate the inner periphery of chamber 19 and the valve chamber 16. As may be seen from a comparison of FIGURES 3 and 4, conduit 24 extends upwardly of the bottom of housing 11 an even smaller distance than does conduit 23. Conduits 22, 23 and 24 communicate with valve chamber 16 through respective passages 25, 26 and 27 (see FIGURES 2, 3 and 4) and by a comparison of FIGURES 3 and 4, it will be seen that passage 25 is located close to the top of housing 11, passage 27 is located close to the bottom thereof, and passage 26 is located intermediate passages 25, 27. The conduits aforesaid thus communicate with axially spaced portions of the valve chamber for a purpose to become clear.

Disposed within valve chamber 16 is a sleeve 28 whose lower end is seated against the shoulder 17 which is formed at the lower end of the valve chamber. Sleeve 28 has its exterior formed to provide three, axially spaced annular grooves 29, 30 and 31 respectively aligned with passages 25, 26 and 27 and each groove bottom is slotted to permit free passage of fluid between the interior and exterior of the sleeve. In order to prevent fluid flow between respective sleeve grooves longitudinally along the exterior of the sleeve, a plurality of O-rings 32 are carried by the sleeve to effectuate a seal between the latter and the valve chamber.

Lapped to the interior of sleeve 28 for an extremely close sliding fit is a valve member 33 formed of axially spaced portions 34, 35 joined by a reduced diameter portion 36. The lower end of the valve member preferably extends beyond the lower extremity of the sleeve 28 and into a recess 37 formed in base 10 in alignment with the valve chamber and such valve member end is provided with an enlarged head 38 for a purpose to be seen. A spring 39 is interposed between the lower end of sleeve 28 and head 38 to urge the valve member downwardly and yieldably maintain it in the position shown in FIGURES 3 and 4 wherein the annular groove 29 of the sleeve is blocked from communication with the interior of the sleeve and wherein annular grooves 30, 31 of the sleeve are in communication with each other through the sleeve interior.

Valve member 33 is preferably formed of a lightweight, non-magnetic material such as aluminum or the like and there is secured thereto an extension member 40 of magnetic material for a purpose to appear. In the present embodiment, portion 34 of the valve member is recessed to receive a shank 41 formed on the end of member 40. Any suitable means may be employed to secure member 40 to the valve member and by way of illustration they may be press fitted together, threaded, cemented, welded or soldered together. In any event, the connection therebetween will preferably be permanent as there will be no necessity for removing the valve member from the sleeve. This is so because the sleeve and the valve member (and its attached magnetic member 40) will necessarily be replaced as a unit (since the sleeve and the valve member are preferably lapped together) in the event of leakage of the valve after long service. Note that member 40 is provided with a radial enlargement 42 which fits within a counterbore 43 formed in the upper end of sleeve 28 to provide a shoulder which engages the bottom of the counterbore and prevents downward movement of the valve member beyond the position seen in FIGURES 3 and 4.

Disposed within cap member 12 is a dielectric hollow spool 44 upon which are wound suitable electro-magnetic windings 45. The coil 46 thus provided has a pair of electrical terminals which will later be described. Interposed between coil 46 and housing 11 is a washer 47 of magnetically permeable material for a purpose to be seen. Washer 47 has a central depressed portion which fits within valve chamber 16 and abuts the upper terminal end of sleeve 28. Washer 47 also is provided with a central aperture through which valve member extension 40 slidably extends into the hollow bore of the coil 46.

In order to improve coil efficiency by increasing the dissipation of heat therefrom and to simplify assembly and disassembly operations, washer 47 may be cemented to the underside of the spool 44 so as to provide therewith a structurally integral unit.

Disposed above coil 46 within cap member 12 is a disk 48 of magnetically permeable material and surrounding the coil and extending between respective upper and lower permeable disks is a sleeve 49 of permeable material. Sleeve 49 is preferably a press fit within cap member 12 to hold disk 48 in place therein. Disk 48 has a central, depending, preferably structurally integral projection 50 which slidably fits within the hollow interior of coil 46 and, in the position of parts seen in FIGURES 3 and 4, is spaced from the upper end of valve member extension 40 to permit upward movement of the valve member as will later be described. From the foregoing, it will be understood that disks 47, 48 and sleeve 49 provide a low resistance path for the magnetic flux generated by the solenoid coil when current is passed therethrough.

The spacing between the end of member 50 and member 40 is substantially equal to the distance through which the valve member is to be shifted so that upon energization of coil 46, member 40 will be pulled by magnetic attraction into abutment therewith (see FIGURE 5). It is to be understood that member 40 is so proportioned that when it is attracted to the position seen in FIGURE 5, its main body portion (that portion above radial enlargement 42) will be substantially flush with the lower face of the lower pole piece washer 47 whose central aperture forms the lower end of the opening in the coil into which member 40 slidably fits.

It is to be understood that in the event the main body portion of member 40 extended materially less than to the end of the coil when the member is attracted thereby as seen in FIGURE 5, considerable magnetic pull would be lost thus requiring a larger solenoid coil to exert the same force as is exerted by the solenoid herein disclosed and requiring considerably more current.

It is further to be understood that any permeable material adjacent the coil and outside the confines of the magnectic path defined by disks 47, 48 and sleeve 49 affects the magnetic field of the solenoid and reduces its efficiency. It is for this reason that valve member 33 and preferably the base, the housing, the cap and the sleeve 28 are formed of non-magnetic material such as aluminum or the like.

As previously mentioned, coil 46 has a pair of electric terminals and in the present embodiment, a pair of spaced-apart prongs 51 (only one of which is seen in FIGURE 5) project downwardly therefrom. These prongs pass through enlarged apertures formed in washer 47 and closely fit within respective receptacles 52 carried by the upper part of housing 11. These receptacles are, of course, electrically insulated in any suitable manner from the housing such as by means of a dielectric sleeve or block 152 and as will be evident, the receptacles and the prongs together provide a plug-in electrical connection which may readily be connected and disconnected merely by inserting the prongs in the receptacles or by removing them therefrom.

Still referring to FIGURE 5, the lower portion of housing 11 carries a pair of receptacles 53 which are similar to receptacles 52 with the exception that these receptacles face downwardly for closely receiving respective prongs 54 which are carried by and project upwardly from base 10. It will readily be apparent that both receptacles 53 and prongs 54 are electrically insulated in any suitable manner from the housing and the base respectively such as by respective dielectric sleeves or blocks 153, 254.

Electrically connecting one of the receptacles 53 with one of the receptacles 52 is a suitable wire 55 or other electrical conductor which passes through a connecting conduit 56 formed in housing 11. The other two receptacles 52, 53 are similarly electrically connected together. Electrically connected to respective prongs 54 are leads 154 (see FIGURES 1 and 5) which extend outwardly of the base and are adapted to be suitably connected to a source of current through any conventional actuating switch.

As best seen in FIGURE 3, conduit 57 is formed in base 10 to place the aperture 13 formed therein in communication with conduit 20 formed in housing 11. Also formed in the base is a conduit 58 which places aperture 15 thereof in communication with conduit 21 of the housing. Referring now to FIGURE 4, there is formed in base 10 a conduit 59 which places aperture 14 of the base in communication with conduit 24 of the housing.

With reference once again to housing 11 and as best seen in FIGURES 2 and 3, there is removably disposed in each semi-annular chamber 18, 19 respective filter elements 60, 61 which divide and separate each chamber into an inner and outer part. In the present embodiment, filter elements 60, 61 are formed of metal which is highly porous to permit passage therethrough of fluid but whose myriads of tortuous passages trap solid foreign matter. Note that each filter element extends nearly half way around the valve chamber and practically its full length to provide a large filtering area. Such large filtering area permits valve operation for long periods before disassembly and cleaning or replacement of the filter elements is required.

The means for maintaining the base 10, housing 11 and the cap 12 together comprises a pair of capscrews 62 (see FIGURES 2, 4 and 5) which are arranged in opposed relation on opposite sides of the valve. These screws are threaded into apertures 63 formed in the base and pass through oversize apertures 64 formed in the housing. The heads of the capscrews fit within and seat against the bottoms of counterbores 65 formed in the cap 12. For a purpose to be seen, the shank of each capscrew is reduced in diameter at 66 for some distance beneath the head thereof and each head is of approximately the same diameter as the screw shank.

As best seen in FIGURE 6, cap 12 provides a "keyhole" shaped, through aperture 68 for each of the capscrews. The enlarged end portion 67 of each keyhole aperture 68 is of a size to readily pass a respective screw head and the smaller aperture portion is of a size to readily pass the reduced diameter portion 66 of a respective capscrew. Each counterbore 65, as may readily be seen, is located at the end of the keyhole slot opposite to its enlarged portion 67 and such counterbores closely received respective screw heads to insure accurate location of the cap when the screw heads are seated therein. In order to clear those shank portions of the capscrews adjacent reduced diameter screw portions 66, each cap is provided with an elongated counterbore 165 in its underside (see FIGURES 4 and 5) which is co-extensive with the elongated keyhole aperture.

When it is desired to remove cap 12 of the valve, it is only necessary to loosen capscrews 62 until their heads have been backed out of respective counterbores 65 and then slightly rotate the head so as to align portions 67 of the keyhole apertures 68 with respective capscrew heads. The cap may then be readily lifted off housing 11. To replace the cap, aperture portions 67 will be aligned with the capscrew heads and the cap then moved to seated relation with the housing with the capscrew heads extending through respective aperture portions 67. The cap will then be rotated slightly so that the capscrew heads will be disposed at the counterbores 65 and the capscrews may then be tightened to seat the capscrew heads in respective counterbores and to draw the cap and the housing closely together.

It is sometimes desirable in valves of the present type to provide for manual as well as electrical operation thereof. Accordingly, what is frequently called "override" means is provided for manually elevating valve member 33 in addition to the before described means for elevating such member electromagnetically. As disclosed in the present embodiment and as best seen in FIGURE 5, base 10 is provided with a recess 69, which intersects recess 37, and in which a plunger 70 is slidable. Plunger 70 has a reduced diameter end portion 71, which slidably fits within a reduced diameter extension 72 of recess 69, and a conical portion 73 connecting the main body of the plunger with the reduced diameter end portion 71. In the present embodiment, plunger 70 has a portion 74 projecting outwardly of the base 10 and an intermediate, radially enlarged shoulder 75 against which is seated one end of a spring 76 which resiliently urges the plunger to the right. A suitable locking ring 77 retains the plunger within recess 69.

Assuming that a suitable inlet pipe (not shown) is threaded into aperture 13 of the base, a suitable outlet pipe (not shown) but connected to a cylinder or other device to which fluid pressure is to be selectively admitted) is threaded into aperture 15 of the base and a suitable exhaust pipe (not shown) is threaded into aperture 14 of the base, operation will be as follows: As best seen in the position of parts shown in FIGURE 3 wherein coil 46 of the valve is de-energized, the inlet pressure existing at aperture 13 of the valve will also be present in annular groove 29 of sleeve 28 having passed from such aperture through conduits 57, 20 through filter element 60 in the semi-annular recess 18, and through passage 25 which connects conduit 22 with valve chamber 16. Passage of fluid axially along the interior of the valve chamber will, of course, be prevented by the annular sealing rings 32 carried by sleeve 28 adjacent groove 29. Passage of fluid pressure to the interior of the sleeve member will be prevented, in the position of parts shown in FIGURE 3, since portion 34 of the valve member blocks the slots which establish communication between the interior of the sleeve and its annular groove 29.

It is to be noted that aperture 15, which is connected to a cylinder of like device, is in communication with the exhaust aperture 14 via conduits 58, 21, through filter element 61 in the semi-annular recess 19, through conduit 23, aperture 26 and annular groove 30 to the interior of sleeve 28 through the slots which place the interior of the sleeve in communication with its annular groove 30. From the interior of the sleeve and referring now to FIGURE 4, fluid may flow to the exhaust aperture 14 through the slots which place the interior of the sleeve in communication with its annular groove 31, through such annular groove and through passage 27 and conduits 24, 59.

When it is desired to pass fluid pressure to the cylinder or other device (not shown) connected to aperture 15 of the valve, coil 46 will be energized by passing an electric current thereto through leads 154. Energization of the coil will create a magnetic field which will attract extension member 40 of the valve member 33 and shift both the extension member and the attached valve member upwardly to the position shown in FIGURE 5. With the valve member thus positioned, flow of fluid through the interior of sleeve 28 to annular recess 31 thereof will be blocked by portion 35 of the valve member while the interior of the sleeve will now be placed in communication with annular recess 29 of the sleeve since portion 34 of the valve member is now clear of the previously blocked slots in the sleeve.

Fluid under pressure may now flow from annular recess 29 to the interior of the sleeve and thence to the device to be actuated via annular recess 30, passage 26, conduit 23, through filter element 61 in the semi-annular chamber 19, and through conduits 21, 58 to the aperture 15.

Upon de-energization of coil 46, spring 39 will return the valve member to the position shown in FIGURES 3 and 4 wherein the inlet aperture 13 will be closed against communication with the outlet aperture 15 and wherein the outlet aperture is once again in communication with the exhaust aperture 14 to thus exhaust the fluid pressure within the device.

It is an important feature of the present embodiment that regardless of the direction in which fluid under pressure is moving through the valve, such fluid is required to pass through a filter element prior to passage to the interior of the sleeve 28. This insures against the entrance of foreign matter between the close fitting parts of the sleeve and the valve member and thus provides for long, trouble-free valve operation.

In the event manual operation of the valve is desired, plunger 70 will be moved to the left (as viewed in FIGURE 5) by pressing its projecting portion 74. As the plunger moves to the left and against the urging of spring 76, conical portion 73 of the plunger will engage beneath head 38 of the valve member 33 and the incline provided by such conical portion will cam the valve member upwardly to the position seen in FIGURE 5. When plunger 70 is released, its spring 76 will return it to the right to the position shown and simultaneously spring 39 of the valve member will return the latter once again to the position seen in FIGURES 3 and 4.

It is to be understood that while the present embodiment discloses the plunger 70 as having a projecting portion 74, it may be desirable to eliminate this projecting portion by terminating the plunger at shoulder 75. This construction would render undesirable manual operation of the valve unlikely yet would still permit the valve to be operated manually, when necessary, by pressing the plunger inwardly with a screwdriver or the like.

When, after long service, it becomes necessary to clean or replace the filter elements 60, 61 or to replace any of the operating parts of the valve, it is only necessary to slightly loosen the capscrews 62 and to remove the cap 12, as before described, by turning it slightly before lifting it off the housing 11. With the cap removed, it is a simple matter to remove the coil 46 by unplugging its prongs 51 from the receptacles 52 carried by the housing. If the valve was disassembled to replace a defective coil, a new one may be plugged into the housing receptacles, the cap replaced and the capscrews tightened. The above described simple operation, it will be observed, may readily be performed by an unskilled workman and in no more than a minute of time.

In the event the valve is being dismantled to replace a worn and leaking valve member and following removal of the coil as above disclosed, the valve member and sleeve assembly may be withdrawn from the housing by grasping extension member 40 and pulling up on it. Following removal of the old asembly, a new one may be inserted in the valve chamber 16 and washer 47, which was previously removed from the old assembly, will be replaced on the housing. The valve will once again be ready for use when the coil and the cap have been reinstalled as previously described.

In the event the filter elements are to be removed for cleaning or replacement, the cap will first be removed as previously mentioned. The housing 11 will then be raised from its position on the base, carrying with it the valve member-sleeve assembly and the coil, which movement automatically withdraws prongs 54 of the base from the receptacles 53 provided by the housing. Filter elements 60, 61 may then be removed from the bottom of the housing, from their respective semi-annular chambers for cleaning or replacement. Note that the capscrews need not be removed from the base since their heads will readily pass through housing apertures 64.

Following restoration of the filter elements within their respective chambers, the housing 11 will once again be positioned over the capscrews and slid therealong to seated relation on the base with prongs 54 seated in receptacles 53 to thus automatically restore the electrical circuit for coil 46. Cap 12 will next be replaced on the housing over the coil as before described and the capscrews tightened to complete the assembly.

From the foregoing it will be understood that all of the normal wearing parts of the valve may be removed from the valve and the valve reassembled with the same or new operating parts in but a few moments time and without disturbing any of the piping or electrical connections. This skill required is therefore well within that of the average workman so that the delay and expense of obtaining the services of an electrician or millwright is obviated. Accordingly, the use of the present valve on production equipment or the like insures that down time of equipment due to valve malfunction or necessary maintenance will never exceed more than a few moments time.

It is another important feature of the present invention that the valve member 33 is "balanced" to obviate differential fluid pressure induced forces which would exert a force on the valve member tending to move it in an axial direction. The reason why this is so may readily be seen in FIGURES 4 and 5 wherein it will be noted that since valve member portions 34, 35 are the same size, their facing areas will be equal. Accordingly, fluid pressure existing between these two portions will act equally thereon, but in opposite directions, thus balancing each other out so that no resultant force will be exerted tending to shift the valve member. The extreme ends of the valve member, each being of the same effective area and each being subjected to the same atmospheric pressure will, in the same manner as above described, obviate differential fluid pressure induced forces which would tend to move the valve member.

Considerable advantage acrues from thus providing a "balanced" valve member. For example, very little spring pressure is required to urge the valve member to the position seen in FIGURE 4 since the spring need only be strong enough to overcome the frictional drag of the valve member, which drag, since no seals are employed, is very small. With the spring required being relatively weak, a small, highly compact solenoid will be adequate to shift the valve member against the force exerted by the spring.

Another advantage of the "balanced" valve member in the combination herein shown is that there is no need to limit the flow area through the valve as the pressure of the fluid being controlled is increased. This is in contrast to many presently available valves through which fluid flow must be progressively limited as fluid pressure increases in order for the valve to function properly. Accordingly, the present valve is highly efficient for use in controlling any fluid pressure within its range without restricting fluid flow and without modifying the valve in any way to compensate for various pressures.

In the embodiment of the invention seen in FIGURE 8, the construction is generally similar to that heretofore described; accordingly, similar parts are identified by the same reference characters but with the suffix "a" added. This embodiment differs from the one earlier disclosed in three major respects. Firstly, in forming the valve member in a plurality of pieces (herein shown to be two) instead of the one piece heretofore employed; secondly, in forming the valve sleeve in a plurality of pieces (herein shown to be three) instead of one; and thirdly, in providing a modified "override" means construction.

For simplification of manufacturing operations and for yet another purpose later to be seen, it has been found highly desirable to form valve member 33a of two pieces. In the position of parts viewed, the lower portion of the valve member (that portion providing the enlarged head 38a) is formed separately from the main body of the valve member. As herein disclosed, portion 35a of the main valve body is formed with a recess to receive a shank 78 formed on the upper end of the enlarged head portion 38a. Any suitable means may be employed to permanently secure the two aforesaid valve member portions together upon assembly of the valve member with the sleeve 28a and such means may be similar to that employed to secure member 40a to the valve member.

Sleeve 28a, as previously mentioned, is formed of three pieces for the same reasons which makes it desirable to form the valve member of two pieces and, as seen in FIGURE 8, the sleeve of this embodiment comprises an upper section 79, a lower section 80, and an intermediate section 81 disposed in end-to-end relation.

As best illustrated in FIGURE 9, the lower portion of upper section 79 provides a plurality of feet 82 herein shown to be three in number. These feet extend axially of the upper section and engage the upper portion of the intermediate section 81. Note that when these two sections are disposed as shown in end-to-end relation, they cooperate to provide three, narrow, circumferentially extending slots 83 whose ends are defined by respective feet and which establish communication between the exterior and the interior of the sleeve. Note also that the intermediate portion of intermediate sleeve section 81 has four radially spaced apertures 84 formed therein which also establish communication between the sleeve's interior and its exterior.

The lower portion of intermediate sleeve section 81 has a plurality of feet 85 similar to feet 82 which engage the upper portion of the lower sleeve section 80. Such intermediate and lower sections cooperate in the same manner as above described to provide three slots 86 which establish communication between the exterior and the interior of the sleeve.

If desired, sleeve sections 79, 80 and 81 may be cemented together to provide a structurally integral assembly; however, this is not essential since the sections will be held in abutting relation when the valve is assembled. Moreover, even upon disassembly of the valve and removal of the valve member-sleeve assembly from housing 11a, the fact that the valve member upper and lower portions and magnetic member 40a are secured together will effectively prevent disassembly of the valve sleeve segments.

Another slight variance in construction which exists between the embodiment disclosed in FIGURE 8 and that disclosed in FIGURES 1 through 7 is that insulating members 254a project slightly above the top surface of the base and into respective conduits 56a. Conversely insulating members 153a terminate short of the lower surface of housing 11a so that a slight gap exists between the opposed insulating members. This construction reduces the possibility of shorting out or grounding the electrical circuit to the coil 46a as will be apparent. A similar construction may be employed at the top of the housing between the insulating members 152 and the portion of the spool 44 from which prongs 51 depend.

Since the remaining construction of the embodiment shown in FIGURE 8 is similar to that previously disclosed in FIGURES 1 through 8 (with the exception of the "override" means presently to be described), it is believed that further description of the valve seen in FIGURE 8 and its mode of operation is unnecessary in the light of the description of the earlier disclosed embodiment.

With respect to the modified "override" means and still referring to FIGURE 8, plunger 70a is slidable as before in recess 69a and has an enlarged diameter end portion 74a which projects outwardly of the base 10a. The terminal end of plunger portion 74a will preferably be knurled as shown for a purpose to appear.

Formed in the underside of plunger 70a is a longitudinally extending slot 87 which slidably receives a pin 88 projecting upwardly of the bottom of the base. Also provided by the plunger is a slot 89 which extends circumferentially of the plunger for a short distance and whose one end intersects the right hand end of slot 87. The left hand end of plunger 70a has an upwardly facing, inclined surface 90 for engaging valve member portion 38a.

Normally, spring 72a urges plunger 70a to the right to the position shown, the plunger being held against further outward movement by means of pin 88 which in this position of parts is seated in the left hand end of slot 87. When it is desired to elevate the valve member 33a manually, plunger 70a will be shifted to the left as before. This will cause plunger surface 90 to engage beneath the valve member and cam it upwardly to the position illustrated. Release of the plunger will permit its spring 72a to return it to the right to the position illustrated.

In the event it is desired to maintain the valve member in its elevated position, the plunger will be shifted to the left as before; however, when pin 88 has reached the righthand end of slot 87, the plunger will be given a slight twist to effect its rotation and position pin 88 in slot 89. This will hold the plunger in, as will readily be apparent, until the latter is rotated in reverse to align pin 88 with slot 87 to thus permit spring 72a to return the plunger to the right to the position illustrated.

While the foregoing embodiments disclose what is known as three-way valves having an inlet port, an outlet port and an exhaust port, the invention is equally applicable to what is known as four-way valves. A valve of the last mentioned type has two outlets instead of one so that it may be employed to control, for example, a double acting fluid cylinder. In one position, a valve of this type places the inlet in communication with one of the outlets and the exhaust in communication with the other outlet. In another position, the valve places the inlet in communication with the other outlet and the exhaust in communication with the one outlet.

FIGURE 10 fragmentarily illustrates a valve of the four-way type which is similar to the three-way type illustrated in FIGURE 8. Accordingly, similar parts are identified with the same reference characters as before but with the suffix "b" added. The valve seen in FIGURE 10 differs from the one shown in FIGURE 8 in two important respects: Firstly, a sleeve corresponding to sleeve 28 is formed of four sections instead of three and comprises an an upper section 79b which is identical to section 79; a lower section 80b which is identical to section 80; and two intermediate sections 81b which are identical to sections 81. With this arrangement of parts it will be seen that the sleeve provides five annular grooves in its periphery instead of three as provided by valve sleeves 28 and 28a.

Obviously, since sleeve 28b is longer than sleeves 28 and 28a, housing 11b will necessarily be higher. Moreover and although not shown, the base of this valve embodiment will have an additional outlet port and the arrangement of the various conduits within the housing which terminate at various portions of the valve chamber bore 16b will be somewhat re-arranged. As herein-disclosed, respective uppermost and lowermost annular sleeve grooves 29b, 31b will be connected by suitable conduits within the housing to an exhaust port in the base, the middle intermediate sleeve groove 30b will be connected by suitable conduits within the housing to an inlet port in the base, and respective upper and lower intermediate sleeve grooves 30b will be connected by suitable conduits within the housing to respective outlet ports within the base.

It is to be noted that since the same sleeve parts may be employed to make up a four-way valve sleeve as are employed to make up a three-way valve sleeve (with the exception, of course, that an additional intermediate sleeve section is used), it will readily be apparent that manufacturing and other allied costs will be greatly reduced because of such parts interchangeability.

Turning now to the valve member 33b, it will be seen that it comprises a lower portion 38b which is identical with portion 38a and a magnetic member 40b identical with members 40, 40a. The main body portion, however, is elongated and comprises in addition to the axially spaced portions 34b, 35b, an intermediate portion 91. Here again, costs are reduced because of the interchangeability between portions 38a and 38b and between 40a and 40b.

Briefly, the operation of the valve seen in FIGURE 10 is as follows: In the position of parts shown, the valve coil is de-energized and the valve member 33b is therefore in its lowermost position. When so positioned, the valve sleeve annular inlet groove is in communication with the uppermost valve sleeve annular outlet groove and the latter is closed off from the valve sleeve annular exhaust groove 29b. The lowermost valve sleeve annular outlet groove is closed off from the inlet groove and is in communication with valve sleeve annular exhaust groove 31b. If now the valve coil is energized to elevate the valve member, the uppermost annular outlet groove will be closed off from the inlet groove and placed in communication with exhaust groove 29b. The lowermost valve sleeve annular outlet groove will be closed off from exhaust groove 31b and placed in communication with the inlet groove. Upon de-energization of the valve coil, spring 39b will return the valve member 33b to its lowermost position seen in FIGURE 10. Although not shown, housing 12b may be formed to provide three semi-annular filter member chambers instead of two so that each of the outlets may be provided with its own filter.

In the embodiment of the invention seen in FIGURE 11, there is illustrated a valve which is similar to that seen in FIGURE 10; accordingly, similar parts are identified by similar reference characters but with the suffix "c" added. While the previously disclosed valve embodiments were of the type whose valve members are normally biased to a predetermined position but which are shifted from such position when and so long as current is passed to the actuating coil, the valve seen in FIGURE 11 has a valve member which may be maintained in either of its two positions without requiring continuous coil energization.

To accomplish the foregoing, the valve seen in FIGURE 11 is provided with two coils instead of one, each being employed to shift the valve member to its respective positions. Coil 46c is similar to coils 46, 46a and 46b; however, the spool 44c of coil 46c has three depending prongs 51c (only one of which is shown) instead of the two employed by the earlier disclosed embodiments for a purpose to be seen. Two of these prongs will be electrically connected with respective ends of the windings of the coil as before while the third will be electrically connected with one of a pair of sleeve members 91 carried by a boss 92 formed in the upper portion of this coil spool. One of the other two prongs 51c carried by the coil 46c will be electrically connected with the other sleeve 91 carried by the upper coil portion to provide an electrical circuit which is common to both coil 46c and also the other coil which is yet to be described. Obviously, housing 11c will be formed to provide three receptacles 52c for receiving respective prongs 51c and base 10c will have three prongs 54c which fit with three receptacles 53c carried by the adjoining housing portion.

In the embodiment seen in FIGURE 11, disk 48c which overlies coil 46c is modified to provide both a structurally integral depending projection 50c which fits within coil 46c but also an upwardly extending projection 93 which fits within the about to be described second coil. Disk 48c is also apertured to receive the boss 92 formed in coil spool 44c. For a purpose to be disclosed, disk projections 50c, 93 are formed with a through central aperture 94.

Seated upon disk 48c about projection 93 and in axial alignment with coil 46c is a coil 95 which is similar to coil 46c and which is wound upon a spool 96 in a similar manner. Coil 95 has depending therefrom a pair of prongs 97 (only one of which is shown) which frictionally fit within respective sleeves 91 carried by the spool of coil 46c. As will be understood, prongs 97 are electrically connected with respecting ends of the windings of coil 95. Positioned above coil 95 is a permeable disk 98 whose function is similar to disk 48c, however, this disk is provided with a central aperture to slidably pass a permeable member 99 which has limited sliding movement within the hollow interior of coil spool 96. For a purpose to appear, a non-magnetic rod 100 is slidable within aperture 94 formed in the projections 50c, 93 of disk member 48c and has its end portions abutting respective permeable members 40c, 99. Obviously, cap 12c will be elongated to accommodate two coils instead of the one hereinbefore disclosed in the previous embodiments.

Other distinctions between this embodiment and the ones previously disclosed is the elimination of the "override" means and a change in the lower valve member end. Valve member end 38c differs from the corresponding parts previously disclosed in that it is reduced in diameter and its radial enlargement eliminated since, in this embodiment, the spring which yieldably urges the valve member to predetermined position has been eliminated. Moreover, end 38c has a pair of axially spaced, annular grooves 101 formed therein for receiving the reduced diameter end 102 of a plunger 103 which is slidable within a bore 104 which intersects recess 37c (which recess is, incidentally, also reduced in size) formed in base 10c. Plunger 103 is yieldably urged to engagement with valve member end 38c by means of a spring 105 which is contained within bore 104 by a suitable set screw 106 or the like threaded into the right hand end of the bore an amount sufficient to obtain the desired spring pressure.

In the position of parts seen in FIGURE 11, operation of this embodiment will be as follows, it being understood that the valve member 33c is resiliently maintained in the position shown by means of the spring-loaded plunger 103 which is seated in one of the annular grooves 101. Upon energization of coil 46c, member 40c will be attracted by magnetic force and pulled up into the coil as described in the first mentioned embodiment. This will, of course, elevate the valve member 33c. Upon elevation of the valve member, plunger 103 will be forced against the spring 105 out of the upper groove 101 and the spring will thereafter shift the plunger to seated relation in the lower groove to thereupon hold the valve member in its elevated position despite de-energization of this coil. Note that elevation of the valve member as above described will also elevate member 99 to project beyond the coil 95 because of the rod 100 which extends between members 99, 40c.

When coil 95 is energized, magnetic force will pull member 99 down to the position shown, and because of rod 100, the valve member and the other associated parts will be returned to the position shown to await the next energization of coil 46c.

In the valve illustrated in FIGURE 12, various parts similar to those theretofore disclosed are identified by the same reference characters but with the suffix "d" added.

With reference to the electrical prongs 51d carried by coil spool 44d, the latter are secured to a depending boss 107 formed integrally with the spool. For a purpose to be seen, boss 107 is of sufficient length to extend through an opening in washer 47d (which opening is proportioned to closely receive the boss) and into close engagement with the defining walls of conduit 56d formed in the housing 11d.

Also formed in spool 44 is a depending boss 108 which is preferably, though not necessarily, carried by the spool in diametrically opposed relation with boss 107. Boss 108 passes through a suitable close-fitting opening in washer 47d and is closely receivable within a pocket 109 formed in the housing 11d. From the foregoing, it will be understood that bosses 107, 108, function as dowels to insure accurate alignment of the washer 47d with the spool and accurate alignment of the spool with the axis of the valve chamber 16d formed in the housing.

In the embodiment seen in FIGURE 12, there has been a simplification of certain parts such as the pin-receiving receptacles 52, 53 and the wire 55 shown in FIGURE 5. In this embodiment, there is provided a longitudinally split metallic tube 110 having reduced diameter end positions pressed into suitable dielectric bushings 111. This tube-bushing assembly is thereafter pressed into housing conduit 56d so that the bushings insulate the tube from the housing. It is to be understood that opposite ends of tube 110 form receptacles for closely receiving respective pins 51d, 54d which latter are thereupon placed in electrical continuity because of the metallic tube aforesaid extending therebetween.

Other refinements of construction shown in FIGURE 12 comprises the elimination of the radial enlargement 42 of member 40 (see FIGURES 3 and 5) and the substitution therefor of a snap ring 112 seated in a suitable groove formed in member 40d. The arrangement of parts is such that snap ring 112 does not engage the underside of washer 47d when the valve is energized; instead, upper movement of the member 40d is arrested by its abutment with the pole piece which is not seen in this view but which is similar to pole piece 50 carried by disk 43 as before disclosed. Snap ring 112 thus functions only to retain the valve member 33d and the valve sleeve 28d together when they are disassembled from the housing since, as before mentioned, such parts are lapped together and are not interchangeable with other like parts.

Additionally, snap ring 112 is relieved of another function provided by radial enlargement 42; that of limiting downward movement of the valve member. In the embodiment seen in FIGURE 12, downward movement of the valve member is limited by engagement of its lower end with a resilient block 113, carried at the bottom of recess 37d in the base 10d, which block cushions downward movement of the valve member. Obviously, if cushioning is not desired, the valve member may instead abut the bottom of the recess 37d.

Referring once again to washer 47d, it will be noted that it too has been simplified by the elimination of its central depressed position and by the axial extension of the upper part of the valve sleeve 28d to abut the underside of such presently flat washer.

Another change, dictated in part by manufacturing economies, has been the elimination of the radially enlarged shoulder at the lower end of the valve member against which was seated the valve return spring 39 (see FIGURES 3 and 5) and the substitution therefor of a snap ring 114 against which is seated valve return spring 39d. Additionally, for a purpose to be disclosed, the lower end of the valve member in this embodiment has a relatively large annular groove 115 whose sides provide spaced-apart, facing shoulders 215, 315 and spaced above groove 115 are a pair of axially spaced, relatively shallow annular grooves 415.

Another distinction between the construction shown in FIGURE 12 and those heretofore disclosed is the provision of a novel gasket 117 between the base 10d and housing 11d. The previously disclosed gasket was merely of the usual type formed of a flat sheet of resilient material which was apertured at appropriate places to accommodate the cooperating conduits formed in the facing surfaces of the bore and the housing. The present gasket, as seen in FIGURES 12 and 13, is convoluted to isolate from each other the various openings in the top surface of the base and such gasket is similar to an O ring in that the various segments thereof are preferably round in cross-section. The various segments of the gasket are structurally integral with each other, such gasket preferably being made by injecting a rubber-like resilient material into a suitably configurated mold.

As will be evident from a study of FIGURE 12, gasket 117 is seated within a recess formed in the upper surface of base 10d which recess is configurated in a manner similar to the gasket. It is to be understood that the depth of the gasket-receiving recess is such that the gasket, when seated therein, projects slightly about the upper surface of the base. Accordingly, when the housing 11d is drawn down against the top surface of the base, the gasket will be compressed to provide a fluid-tight seal therebetween. Note that the relatively small area of contact between gasket 117 and the lower face of the housing 11d provides for a relatively high unit per area pressure therebetween which is much more effective in reducing leakage than is a conventional gasket which, because of its relatively large area of contact, is subjected to relatively low unit per area pressure.

Obviously, gasket 117 is not limited to segments which are round in cross-section but may have segments with square, triangular, or other suitably configurated cross-sections. It is further to be understood that advantages other than improved sealing accrue from use of the presently disclosed gasket. One of such advantages is that since the gasket is largely embedded in the recess in the base, it will be protected against damage when the housing is disassembled from the base.

With reference now to FIGURES 12 and 14, the present valve embodiment is provided with an improved "over-ride" means for effecting manual valve operation. In this embodiment, plunger 70d projects but slightly from the recess 69d in which it is slidable. For a purpose to be seen, the outer end of the plunger is provided with a screw driver slot and the inner end is provided with an eccentrically positioned, axially extending abutment 118 (see especially FIGURE 14). Extending from the outer end of the plunger to a point spaced from its inner end is a central bore 119 whose outer end is internally threaded to receive an externally threaded plug 120. Extending transversely of the plunger is an aperture 121 which intersects the inner end of bore 119 and which slidably passes a pin 122 anchored in the base 10d. As illustrated in FIGURE 14, plunger 70d is provided with a spiraled grooved 123 whose one end intersects aperture 121 and whose other end provides a seat 124 for receiving pin 122. Groove 123 is, of course, proportioned to slidably pass pin 122.

Means are provided for resiliently urging plunger 70d to the position shown in FIGURE 12 and as herein disclosed, a coil spring 125 is interposed between pin 122 and the previously mentioned plug 120. To insure free movement of the plunger relative to the spring, the inner end of the latter is enclosed in a thimble-like member 126 whose closed end bears against the pin 122 and which is freely slidable within bore 119.

Operation of the above described "over-ride" means is as follows: Plunger 70d will be engaged with a screw driver and pressed inwardly a slight amount and simultaneously rotated in the direction of the arrow seen in FIGURE 14. This movement of the plunger will dispose pin 122 in groove 123. Continued inward movement of the plunger against the resiliency of spring 125 will cause continued rotation of the plunger because of the pin riding in the spiral groove. Rotation of the plunger in the manner aforesaid will engage plunger abutment 118 beneath valve shoulder 215 and thus effect elevation of the valve plunger 33d.

In the embodiment herein disclosed and when the plunger has been pressed inwardly an amount sufficient to dispose the pin at that end of groove 123 having seat 124, a release of the plunger will permit spring 125 to urge the seat and the pin together and thus hold the valve member in its elevated position. To return the parts to the position shown, it is merely necessary to insert a screwdriver in the plunger slot and give the plunger a slight twist in the direction opposite to that indicated by the arrow. This will dislodge pin 122 from seat 124 and permit spring 125 to return the plunger to the position seen in FIGURE 12, wherein the pin is disposed in aperture 121. In certain applications it may be undesirable to lock the plunger in its inward position; accordingly, in such circumstancees, the seat 124 at the end of groove 123 may be omitted whereupon release of the plunger will immediately result in its return to the position seen in FIGURE 12.

In the embodiment seen in FIGURE 15, there is shown a valve which is similar to the one seen in FIGURE 12; accordingly, similar parts are identified by the same reference characters but with the suffix "e" added. In this embodiment, valve return spring 39d and the snap ring 114 (both seen in FIGURE 12) have been eliminated since this valve is adapted to be actuated by two solenoid coils in a manner similar to the valve illustrated in FIGURE 11.

The means provided for holding the valve plunger 33e in its uppermost position following its elevation comprises a U-shaped spring member 127 secured at the bottom of recess 37e of base 10e in any suitable manner. The legs of member 127 extend upwardly of the recess and are spaced to receive therebetween the lower end of the valve member. The free ends of such legs are provided with inwardly directed, facing abutments 128 which are spaced-apart from each other a distance less than the diameter of the lower end of the valve member for seating within grooves 415.

In the position of parts seen in FIGURE 15, the valve member is in its lowermost position, being retained therein by means of abutments 128 of the U-shaped member 127 which abutments are resiliently seated in the uppermost annular groove 415. If now the proper solenoid coil is momentarily energized to elevate the valve member, upward movement thereof will first spring the legs of member 127 apart to unseat the abutments 128 from the uppermost groove and subsequent movement thereof will align the lowermost groove with the abutments when the valve member is fully elevated. Upon alignment of the lowermost groove 415 with the abutments, the latter will spring into seated relation therein to thus retain the valve member in its fully elevated position, despite de-energization of the coil which effected upward movement of the valve member, until such time as the other solenoid coil is momentarily energized to force the valve member down once again to the position seen in FIGURE 15.

Although not seen in FIGURE 15, "over-ride" means similar to that shown in FIGURES 12 and 14 may be provided to effect manual operation of the valve member. Such "over-ride" means will differ only in that the plunger will provide, in addition to the spiral groove 123 seen in FIGURE 14, an identical spiral groove on the other side of the plunger.

The provision of two spiral grooves in the plunger will permit the latter to be rotated in either direction from its non-operative, outermost position as will be evident. Rotation of the plunger from such position in the direction of the arrow (FIGURE 14) will elevate the valve members to its uppermost position as before described because of engagement of the plunger abutment beneath the valve member shoulder 215e. Rotation of the plunger in the opposite direction from such position will engage the plunger abutment above the valve member shoulder 315e and thus urge the valve member downwardly to its lowermost position.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that our invention is not limited thereto.

We claim:

1. A valve for controlling flow of fluid, comprising housing means having an internal valve chamber through which fluid is adapted to flow and having a pair of filter chambers spaced from said valve chamber and in communication therewith, said housing means also having an internal exhaust conduit in communication with said valve chamber and an internal inlet conduit and an internal outlet conduit terminating at respective filter chambers, valve means shiftable within said valve chamber to control flow of fluid therethrough, and filter means disposed within respective filter chambers intermediate respective termini of said inlet and outlet conduits and said valve chamber for removing foreign matter from fluid passing along said inlet and outlet conduits in a direction toward said valve chamber.

2. A valve for controlling flow of fluid, comprising housing means having an internal valve chamber through which fluid is adapted to flow and having a pair of filter chambers spaced radially outwardly of said valve chamber and each partially encircling the latter and in communication therewith, said housing means also having an internal exhaust conduit in communication with said valve chamber and an internal inlet conduit and an internal outlet conduit terminating at respective filter chambers, valve means shiftable within said valve chamber to control flow of fluid therethrough, and filter means disposed within respective filter chambers intermediate respective termini of said inlet and outlet conduits and said valve chamber for removing foreign matter from fluid passing along said inlet and outlet conduits in a direction toward said valve chamber.

3. A valve for controlling flow of fluid, comprising housing means having an internal valve chamber through which fluid is adapted to flow and having a pair of filter chambers spaced radially outwardly of said valve chamber and each partially encircling the latter and in communication therewith, said housing means also having an internal exhaust conduit in communication with said valve chamber and an internal inlet conduit and an internal outlet conduit terminating at respective filter chambers, a sleeve member having apertures in its wall through which fluid may flow to its interior disposed within said valve chamber, valve means closely fitting within said sleeve member and reciprocable therein to control flow of fluid through the wall apertures of said sleeve member and consequently through said valve chamber, and filter means disposed within respective filter chambers intermediate respective termini of said inlet and outlet conduits and said valve chamber for removing foreign matter from fluid passing along said inlet and outlet conduits in a direction toward said valve chamber.

4. A valve for controlling flowing fluid, comprising a housing providing a valve chamber through which fluid is adapted to flow and having a valve member shiftable within said chamber between first and second positions to control fluid flow through said chamber, a pair of electromagnetic coils carried by said housing in end to end relation for shifting said valve member between said positions, a fixed, magnetically permeable member interposed between said coils, a pair of shiftable, magnetically permeable members disposed on opposite sides of said fixed member and each shiftable upon energization of respective coils to effect movement of said valve member between said positions, and a non-magnetically permeable member extending between said shiftable members to translate movement of one to movement of the other.

5. A valve for controlling flow of fluid, comprising a housing providing a valve chamber through which fluid is adapted to flow and having a valve member reciprocable within said chamber between first and second positions to control fluid flow through said chamber, a pair of electromagnetic coils carried by said housing in end to end relation, said coils having their openings in axial alignment, a pair of magnetically permeable plugs, each movable within a respective coil opening and shiftable through energization of its respective coil, one of said plugs being connected to said valve member, a disc of magnetically permeable material held in fixed relation between said coils and having integral tubular portions on opposite sides respectively fitting within the adjoining coil openings, the terminal end of each tubular portion being abuttable with a respective one of said plugs to limit movement of the same inwardly of said coil, and a non-magnetically permeable rod slidably extending through said tubular portions and having its opposite ends engageable with said plugs so that movement of either plug effects movement of said valve member.

6. A valve for controlling flow of fluid, comprising a housing providing a valve chamber through which fluid is adapted to flow and having a valve member reciprocable within said chamber between first and second positions to control fluid flow through said chamber, a first magnetically permeable plug connected to said valve member and extending axially therefrom, a first electromagnetic coil having an opening therethrough, said first plug being reciprocable within the inner end of said opening, a second electromagnetic coil having an opening therethrough, the inner end of said second coil adjoining and being axially aligned with the outer end of said first coil opening, a magnetically permeable disc fixed between adjoining faces of said coils and having tubular portions at opposite sides, one tubular portion extending a predetermined distance into the outer end opening of said first coil and the opposite tubular portion extending a predetermined distance into the inner end opening of said second electromagnetic coil, a second magnetically permeable plug shiftable within the outer end opening of said electromagnetic coil, and a non-magnetically permeable rod slidably extending through said tubular portions and having its opposite ends engageable with said first and second plugs so that movement of said second plug is transmitted to said first plug and its connected valve member.

7. The construction according to claim 6 wherein said first coil has electrical plug-in connection with said valve housing by axial movement of said first coil toward said valve housing.

8. The construction according to claim 6 wherein said first plug extends outwardly of said valve housing to locate the axial position of said first coil, said tubular portions locating axial position of said first and second coils.

9. The construction according to claim 6 wherein axial movement of said first coil to position against said valve housing automatically effects plug-in connection of electrical terminals carried by said first coil and said valve housing, and wherein axial movement of said second coil to position against said disc automatically effects plug-in connection of electrical terminals carried by said coils.

References Cited in the file of this patent
UNITED STATES PATENTS

| | | |
|---|---|---|
| 1,691,866 | Bentley | Nov. 13, 1928 |
| 1,822,668 | Protzeller | Sept. 8, 1931 |
| 1,883,766 | Cox | Oct. 18, 1932 |
| 2,040,964 | Tarleton | May 19, 1936 |
| 2,389,895 | Colley | Nov. 27, 1945 |
| 2,543,010 | Gardner | Feb. 27, 1951 |
| 2,591,514 | Courtot | Apr. 1, 1952 |
| 2,616,660 | Morehouse | Nov. 4, 1952 |
| 2,630,139 | Nagel | Mar. 3, 1953 |
| 2,641,279 | Baldwin | June 9, 1953 |
| 2,750,962 | Kreitchman | June 19, 1956 |
| 2,835,468 | Sparks | May 20, 1958 |
| 2,880,753 | Wilkins | Apr. 7, 1959 |
| 2,892,612 | Georgieff | June 30, 1959 |
| 2,937,660 | Griswold | May 24, 1960 |
| 2,975,340 | Jencks | Mar. 14, 1961 |

FOREIGN PATENTS

| | | |
|---|---|---|
| 1,200,777 | France | July 6, 1959 |

OTHER REFERENCES

Automotive Industries (article), Jan. 1, 1958 (page 110).